Jan. 25, 1938.  C. W. WILDEBOUR  2,106,197

AUTOMATIC LIQUID SHUT-OFF DEVICE

Filed March 30, 1936

INVENTOR.
Charles W. Wildebour
BY Fred C. Matheny
ATTORNEY

Patented Jan. 25, 1938

2,106,197

UNITED STATES PATENT OFFICE 2,106,197

AUTOMATIC LIQUID SHUT-OFF DEVICE

Charles W. Wildebour, Olympia, Wash.

Application March 30, 1936, Serial No. 71,651

6 Claims. (Cl. 226—127)

This invention relates to automatic liquid shut off devices and the primary object of this invention is to provide liquid control means by which a flow of liquid will be automatically shut off when the level of liquid in a receptacle which is being filled has reached the discharge end of a conduit through which liquid is being delivered to said receptacle.

Another object of this invention is to provide liquid shut off devices which utilize minus pressure or partial vacuum produced within a chamber by a stream of liquid flowing therethrough for the purpose of drawing in liquid and bringing about the closing of a shut off valve when the level of a liquid rises high enough to submerge the lower or discharge end of a nozzle containing the liquid shut off devices.

Another object of the invention is to provide automatic liquid shut off devices of this nature adapted to be used in connection with a conduit having a manually operated valve, said automatic shut off devices having shut off means adapted to open automatically as soon as the manually operated valve is closed.

In many instances where liquid is discharged from a conduit into a receptacle it is impossible to observe the level of the liquid as it rises in the receptacle. This often results in getting too much liquid in the receptacle or in running the receptacle over and spilling the liquid. One well known instance of this difficulty is to be found in the filling of gasoline tanks at gasoline service stations. This invention overcomes the difficulty above set forth and, as illustrative of one instance where said invention may be used to advantage, I have shown and described the invention as applied to the discharge end of a gasoline dispensing hose of the usual type. It will be understood, however, that said invention is susceptible of use on substantially any liquid dispensing conduit where it is desired to shut off the flow of liquid from the conduit when the liquid in a receptacle rises to the level of the discharge end of the conduit.

Other and more specific objects of this invention will be apparent from the following description taken in connection with the accompanying drawing.

In the drawing, Fig. 1 is a side elevation of my device showing the same used in connection with the filler hose of a gasoline service station.

Fig. 2 is a longitudinal sectional view on a larger scale of the same, a fragment only of the discharge fitting of the filler hose being shown.

Figs. 3, 4 and 5 are sectional views substantially on broken lines 3—3, 4—4 and 5—5 of Fig. 2, respectively, Fig. 5, being fragmentary.

Like reference numerals designate like parts throughout the several views.

Figure 1:
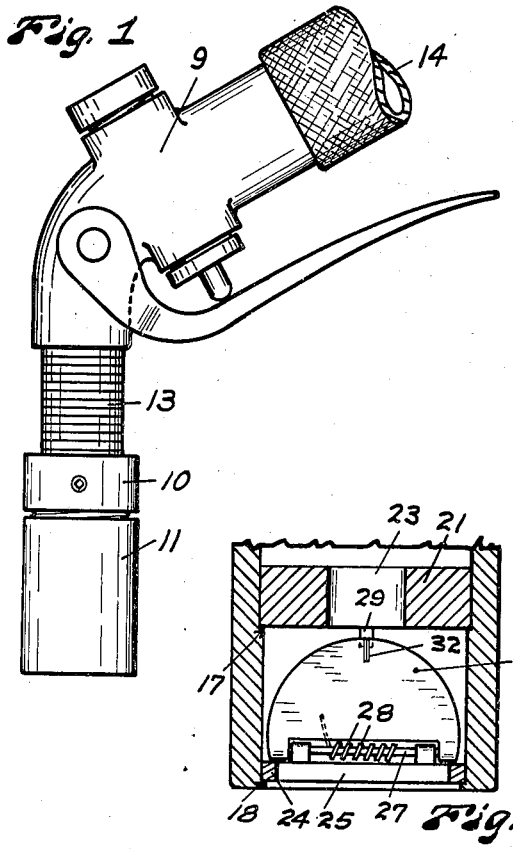
Figure 2:
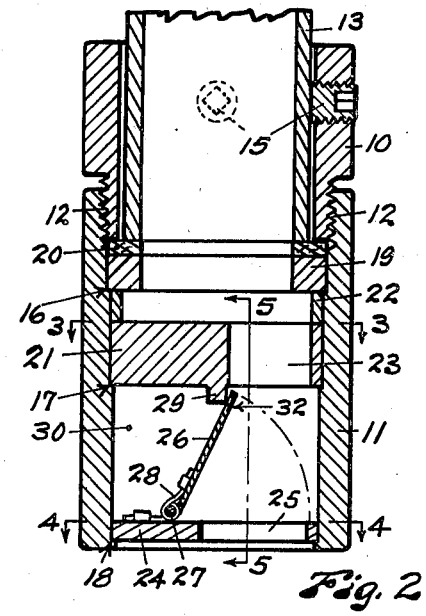

Referring to Figs. 1 and 2, the numerals 10 and 11 designate two housing parts having end portions provided with interfitting threads 12. The housing part 10 is adapted to be slipped over and secured to the discharge end of a liquid conduit member. In the drawing I have shown the housing part 10 slipped over the discharge fitting 13 on the end of a gasoline service station filler hose 14. Set screws 15 are provided for securing the housing part 10 to the fitting 13. Obviously the use of this device is not limited to a gasoline station service hose but the same may be used in connection with substantially any conduit through which liquid is discharged.

Figure 4:
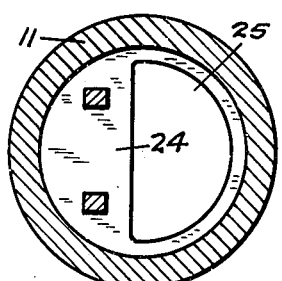

The lower housing member 11, is preferably provided with three annular shoulders 16, 17 and 18 respectively. A ring 19 rests on the upper shoulder 16 and a gasket 20, supported on the ring 19, provides a sealing means against which the ends of the fitting 13 and housing part 10 may engage to provide a liquid tight connection at this location when the two housing parts 10 and 11 are screwed together. A partition member 21 rests on the annular shoulder 17 and is preferably held in place by a sleeve 22 which is provided between it and the ring 19. A liquid passageway 23 is provided in the partition 21 to one side of the center of said partition. An end plate 24 rests on the lower shoulder 18. The end plate 24 is provided with a discharge opening 25 which is positioned in alignment with the liquid passageway 23 in the partition member 21. The opening 25 is larger than the liquid passageway 23 so that a stream of liquid flowing through liquid passageway 23 will discharge freely through opening 25 without entirely filling the opening 25 and without being retarded to any substantial extent by the end plate 24. The opening 25 as shown in Fig. 4, of the drawing is substantially semi-circular in shape but this shape may be varied as long as said opening 25 is made larger than the liquid passageway 23.

Figure 3:
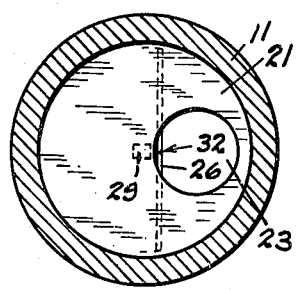

A liquid shut off member in the nature of a flap valve 26 is hinged by pivot means 27 to the end plate 24 adjacent the edge of the opening 25. A spring 28 is provided in connection with the flap valve 26 to yieldingly urge said flap valve into an open position with respect to the discharge opening 25, as shown in Fig. 2. A stop member 29 is provided on the bottom of the partition 21 adjacent the passageway 23 for limiting the opening movement of the flap valve 26. It will be noted that when the flap valve 26 is in the open position the top edge of said flap valve will project a slight distance into the path of the stream of liquid which is flowing through the liquid pasageway 23, see Figs. 2 and 3. It does not, however, project far enough into this liquid stream to cause the valve 26 to be closed, in opposition to the force of the spring 28, by liquid flowing at the velocity for which the device is designed to operate. Projecting the top edge of the valve 26 slightly into the liquid stream, as above set forth, has been found to result in a quicker closing of the valve when the lower end of the housing member 11 is submerged in liquid.

It will be understood that this automatic shut off device may be built into a discharge fitting or nozzle as an integral part thereof instead of being separately made and attached to a discharge fitting or member.

The construction shown in Fig. 2, provides quick and easy assembly and easy access to internal parts. In assembling this device the plate 24, partition 21, collar 22, ring 19 and gasket 20 are successively inserted in the lower housing part 11. The upper housing part 10 is preferably slipped onto the discharge fitting 13 and these two parts are secured together, with their lower ends substantially flush with each other, by tightening the set screws 15. The housing parts 10 and 11 are then screwed together tight enough to seal the end of the housing part 10 and the end of the fitting 13 firmly against the gasket 20 so as to prevent leakage of the liquid. The end plate 24 fits snugly enough to prevent accidental displacement of said end plate and to prevent any undesirable leakage around said end plate.

The space between the partition 21 and end plate 24 constitutes a valve chamber 30 for the reception of the valve 26. The valve 26 is of substantially semicircular shape and space will be left between the edges of said valve 26 and the wall of the lower housing member 11 when the valve 26 is in the open position, see Fig. 5.

In the operation of this device the end of the housing member 11 is positioned in a receptacle into which liquid is to be introduced at about the level to which said receptacle is to be filled and the manually operated valve 9 is opened. This permits liquid to enter the chamber above the partition 21, flow downwardly in a stream through liquid passageway 23 and discharge through the larger liquid discharge opening 25 without entirely filling said discharge opening 25. This discharging stream of liquid seems to carry with it some of the air from the valve chamber 30 and seems to induce a partial vacuum in said chamber 30. As soon as the liquid in the receptacle which is being filled rises around the lower end of the housing member 11 and submerges the opening 25 the partial vacuum in the valve chamber 30 seems to draw liquid into the chamber 30 and this liquid seems to enter behind the valve 26 and then be drawn out into the discharging stream of liquid with sufficient force to overcome the comparatively light resistance of the spring 28 and carry the valve 26 with it. As soon as a substantial portion of the valve 26 is moved into the descending stream of liquid said valve will be carried downwardly by said descending stream of liquid and very quickly closed over the opening 25. The valve 26 will remain closed as long as a substantial liquid pressure is maintained in the chamber above it. This automatically shuts off the flow of liquid into a receptacle as soon as the liquid rises to the level of the discharge end of the nozzle or housing part 11. The two housing parts 10 and 11 and devices contained therein thus constitute an automatic shut off liquid discharge nozzle in which the shut off mechanism is actuated into closed position by a rise of liquid around the lower end of said nozzle.

As soon as the manually operated valve 9 above the flap valve 26 is closed the major portion of the liquid pressure on the flap valve 26 will be cut off and the spring 28 will raise said flap valve to an open position. Usually the flap valve 26 does not seal perfectly on the end plate 24 but provides a slight leakage which relieves pressure within the nozzle as soon as the manually operated valve is closed and permits the flap valve to open immediately thus allowing the small amount of liquid which remains in the nozzle to discharge into the receptacle before the nozzle has been removed from the receptacle. To insure a slight leakage past flap valve 26 when said flap valve is in closed position a small groove 32 may be provided in the edge of said flap valve.

This device is especially advantageous for use on dispensing conduits where liquids are dispensed at comparatively low pressure but the use of the same is not limited to low pressure operation.

Figure 7:
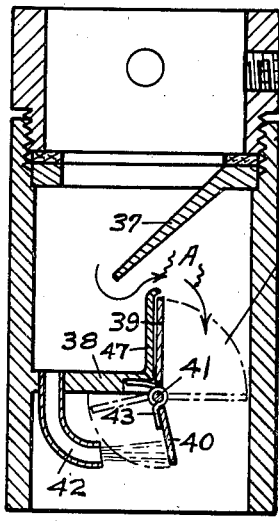
Fig. 7 is a longitudinal sectional view of a modified form of the invention.
Figure 6:
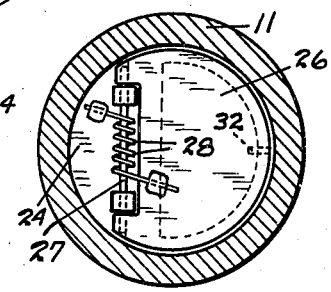
Fig. 6 is a sectional view similar to Fig. 4, except that the flap valve is shown in a closed position in Fig. 6.

In Fig. 7, I have shown a modified form of automatic liquid shut off device provided with a valve which will be automatically closed when liquid within a container which is being filled rises into the nozzle of the shut off device. In said Fig. 7, 36 is a nozzle housing. 37 is an inclined deflector member in said housing. 38 is a transverse partition member extending partially across said housing. A valve 39—40, of the butterfly type, is mounted on a transverse pivot means 41 which is positioned at the front edge of the partition member 38. A tube 42, of relatively small size, and of substantially L shape is connected with the partition member 38 and extends downwardly therefrom and forms a conduit connected with the space above partition 38 and directed toward the lower end portion 40 of the valve member. A spring 43 yieldingly urges the valve member into the upright position shown in Fig. 7.

When liquid is admitted to the upper portion of the nozzle member 36 a small stream of liquid from the tube 42 will impinge against the lower portion 40 of the valve and cooperate with the spring 43 to maintain said valve in the open position shown in Fig. 7 while the main flow of liquid will follow the course of the arrows A and discharge through a passageway 44. The lower end portion 40 of the valve is inclined so as to extend a short distance into the main flow passageway 44. This provides some pressure from the main stream of liquid opposing the small stream from the pipe 42 and tending to close the valve. A non-movable upright guard member 47 protects the upper portion 39 of the valve member from direct pressure of the liquid in a direction which would tend to close the valve. When liquid rises into the lower end of the nozzle member 36 and submerges the lower end of the tube 42 it will reduce the force of the stream which is directed by the pipe 42 against the lower portion 40 of the valve and the pressure exerted by the main flow of liquid on the inclined lower portion 40 of the valve will overcome the force of the spring 43 and the reduced force of the small stream from the pipe 42 and will start to move the valve portion 39 away from the guard member 47 allowing the main stream to catch the upper valve portion 39 and move the valve into closed position as respects the passageway 44. The valve will remain closed as long as a substantial pressure is exerted on the valve portion 39. After the valve has been closed and the main flow of liquid shut off a small stream will continue to flow from the pipe 42. As soon as the flow of liquid to the nozzle 36 is shut off the pressure on valve portion 39 will drop and the valve member 39—40 will be returned by the spring 43 to the open position shown in Fig. 7 and will not again be closed until the end of pipe 42 is again submerged.

The foregoing description and accompanying drawing disclose a preferred embodiment of this invention but it will be understood that this disclosure is merely illustrative and that changes may be made within the scope and spirit of the following claims.

I claim:

1. In an automatic liquid shut off device, a liquid discharge nozzle; adapted to be positioned in a receptacle into which liquid is being introduced; means defining a path of flow of a stream of liquid through said nozzle a normally open liquid shut off valve in said nozzle; pivot means mounting the lower edge of said valve in spaced relation from the path of flow of the stream of liquid; and means supporting said valve in an inclined position when the valve is open with the upper edge portion of the valve inclined toward the path of the stream of liquid and substantially tangent to the path of flow of the stream of liquid leaving a space behind said valve whereby said valve is movable into a closed position by entrance of liquid into said nozzle and behind said valve upon submergence of the end of said nozzle.

2. In an automatic liquid shut off device, a liquid discharge nozzle provided with liquid passageway means defining a path of flow of liquid therethrough, and having a chamber positioned at one side of the path of flow of the liquid; a liquid shut off device positioned to extend substantially across the open side of the chamber, said liquid shut off device providing a restricted communication between the chamber and the interior of the nozzle when it is in open position, said shut off device being movable into obstructing position as respects said liquid passageway when closed; and means yieldingly holding said liquid shut off device in open position, said liquid shut off device being adapted to be moved by the liquid flowing therethrough into a closed position in response to the entrance of liquid behind said liquid shut off device when the end of the nozzle is submerged in liquid.

3. In an automatic liquid shut off device, a liquid discharge nozzle provided with liquid passageway means defining a path of flow of liquid therethrough; and having a chamber positioned at one side of the path of flow of the liquid; a flap valve pivotally mounted in said chamber yieldingly supported in an open position adjacent one side of the path of flow of the liquid, the edges of said flap valve having clearance as respects the walls of said chamber whereby suction will be exerted in said chamber by the flowing liquid when the end of said nozzle is not submerged and liquid will enter behind said flap valve when the end of said nozzle is submerged; and means yieldingly holding said flap valve in open position, said flap valve being adapted to be moved into closed position by the liquid flowing through the nozzle when liquid submerges the discharge end of the nozzle and enters behind said flap valve.

4. In an automatic liquid shut off device, a discharge nozzle; two spaced apart transverse walls in said discharge nozzle providing a chamber therebetween and having aligned openings therein through which liquid may discharge, the opening in the wall nearest the discharge end of the nozzle being larger than the opening in the other wall; a flap valve pivotally mounted in said chamber yieldingly supported in an open position adjacent one side of the path of flow of the liquid, the edges of said flap valve having clearance as respects the walls of said chamber when the valve is open whereby liquid may enter behind said flap valve; and means yieldingly holding said flap valve in open position, said flap valve being adapted to be moved into closed position by the liquid flowing through the nozzle when liquid submerges the discharge end of the nozzle and enters behind said flap valve.

5. In an automatic liquid shut off device, a cylindrical liquid discharge nozzle; a transverse partition in said discharge nozzle at a distance from the lower end thereof, said partition having a liquid passageway therethrough of substantially smaller diameter than the nozzle positioned to one side of the axis of the nozzle; an end wall in the discharge end portion of said nozzle spaced from said partition and having a liquid discharge opening of larger size than the liquid passageway in said partition positioned in alignment with said liquid passageway; a pivotally mounted normally open flap valve positioned between said partition and said end wall and adapted to be moved to close said discharge opening; and a spring yieldingly holding said flap valve open.

6. In an automatic liquid shut off device, a tubular liquid discharge nozzle; a transverse partition in said discharge nozzle, said partition having a liquid passageway therethrough positioned adjacent one side of the nozzle; an end wall in the discharge end portion of said nozzle spaced from said partition and having a liquid discharge opening of larger size than the liquid passageway in said partition in alignment with said liquid passageway in said partition, said partition and said end wall providing a chamber therebetween wherein a partial vacuum is formed by the liquid issuing from the liquid passageway in said partition; a flap valve in said chamber pivotally mounted adjacent said end wall and movable between an open and a closed position as respects said discharge opening in said end wall; means yieldingly urging said flap valve into open position; and stop means positioning said flap valve so that the upper edge portion of the flap valve is slightly within the stream of liquid passing through the liquid passageway within the partition, whereby said flap valve will be closed in response to a rush of liquid into said chamber when the lower end of said nozzle is submerged.

CHARLES W. WILDEBOUR.